(12) United States Patent
Keller et al.

(10) Patent No.: US 12,736,120 B2
(45) Date of Patent: Sep. 15, 2026

(54) HUB BODY FOR A COMPOSITE WHEEL, IN PARTICULAR FOR A COMPOSITE GEAR WHEEL, A COMPOSITE WHEEL, IN PARTICULAR A COMPOSITE GEAR WHEEL, AND A STEERING UNIT FOR A MOTOR VEHICLE

(71) Applicant: IMS Gear SE & Co. KGaA, Donaueschingen (DE)

(72) Inventors: Alexander Keller, Bonndorf (DE); Sebastian Birk, Trossingen (DE); Eugen Stoppel, Muehlingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 19/010,992

(22) Filed: Jan. 6, 2025

(65) Prior Publication Data

US 2025/0224026 A1 Jul. 10, 2025

(30) Foreign Application Priority Data

Jan. 10, 2024 (EP) .................................... 24151239

(51) Int. Cl.
*F16H 55/06* (2006.01)

(52) U.S. Cl.
CPC ....... *F16H 55/06* (2013.01); *F16H 2055/065* (2013.01)

(58) Field of Classification Search
CPC .... F16H 55/06; F16H 2055/065; F16H 55/17; B29C 2045/4057; B29C 2045/4063;
(Continued)

(56) References Cited

U.S. PATENT DOCUMENTS 4,077,274 A * 3/1978 Johnson .................. F16H 55/12
74/447
2002/0043124 A1* 4/2002 Shiga ...................... B29C 45/16
74/439
(Continued)

FOREIGN PATENT DOCUMENTS

DE 10119235 A1 10/2001
EP 2735771 A1 5/2014
(Continued)

OTHER PUBLICATIONS

Machine translation of KR 100788741 B1, obtained from FIT Database (Year: 2007).*
(Continued)

*Primary Examiner* — Thomas C Diaz
(74) *Attorney, Agent, or Firm* — Nath, Goldberg & Meyer; Joshua B. Goldberg

(57) ABSTRACT

A hub body (16) for a composite wheel (10), such as a composite gear wheel (12) is constructed with an outer lateral surface (24) arranged along an axis of rotation (14) between first and second front sides of the hub (20, 22). An outer lateral surface (24) arranged along the axis of rotation (14) between the first and second front sides of the hub (20, 22) has an engagement gearing (28) and a convex outer lateral section (64). In one configuration, the composite gear wheel (12) is used in a steering unit for a motor vehicle.

14 Claims, 10 Drawing Sheets

(58) Field of Classification Search
CPC ....... B29C 45/401; B60B 19/00; B60B 27/00; B62D 3/02
See application file for complete search history.

(56) References Cited

U.S. PATENT DOCUMENTS

| | | | | |
|---|---|---|---|---|
| 2015/0202705 | A1* | 7/2015 | Bittner | B23P 15/14 451/73 |
| 2016/0123451 | A1* | 5/2016 | Ishiki | B62D 3/04 74/446 |
| 2017/0120487 | A1 | 5/2017 | Brochot et al. | |

FOREIGN PATENT DOCUMENTS

| | | | | |
|---|---|---|---|---|
| EP | 2960548 | A1 | 12/2015 | |
| FR | 397146 | A * | 4/1909 | F16H 55/06 |
| JP | 55041273 | A | 3/1980 | |
| JP | 2022103385 | A | 4/2002 | |
| JP | 2013061104 | A | 4/2013 | |
| KR | 100788741 | B1 * | 12/2007 | F16H 55/06 |
| KR | 20230094831 | A | 6/2023 | |

OTHER PUBLICATIONS

European Search Report of the priority application dated Jun. 10, 2024.

* cited by examiner 10, 12
24
30
32
28
70
48
44
38
40
26
14
16

HUB BODY FOR A COMPOSITE WHEEL, IN PARTICULAR FOR A COMPOSITE GEAR WHEEL, A COMPOSITE WHEEL, IN PARTICULAR A COMPOSITE GEAR WHEEL, AND A STEERING UNIT FOR A MOTOR VEHICLE

FIELD

The invention relates to a hub body for a composite wheel, in particular for a composite gear wheel, to a composite wheel, in particular to a composite gear wheel, and to a steering unit for a motor vehicle.

BACKGROUND

Composite wheels, which are primarily used, for example, as composite gear wheels in motor vehicle steering units typically have a hub body and a ring body arranged radially outside the hub body. In the case of composite gear wheels, the ring body comprises an external gearing that can be brought into engagement with another gear wheel. In this particular embodiment of the composite wheel, the ring body is therefore often referred to as a ring gear.

The hub body and the ring body are generally made from different materials. The hub body is often made from metal and the ring body from plastic. A manufacturing method known from EP 1 780 445 A1, for example, provides overmolding the metal hub body with the ring body using a plastic injection molding process.

In order to achieve a permanent connection between the hub body and the ring body, the hub body and the ring body are often connected to each other, in particular with an interlocking fit. It is known to apply an engagement gearing to the hub body in order to transmit torque between the hub body and the ring body. Up until now, in order to transmit axial forces, shoulders and/or grooves, for example, have been arranged on the hub body, into which the ring body meshes.

The shoulders and/or grooves are regularly limited by relatively sharp edges, particularly in the axial direction. Additional sharp edges on the hub body can result from the application of the engagement gearing. The engagement gearing is frequently produced by means of gear hobbing, wherein sharp edges can occur, particularly in the area of the hob run-out or in the area where the engagement gearing penetrates through the shoulder or groove.

When the plastic-injected ring body cools down, the sharp edges regularly lead to shrinkage stress cracks due to stress concentrations and thus to premature failure of the component.

Local excess stresses that promote the formation and propagation of cracks can also result during operation due to radial and axial forces that occur at sharp edges.

In particular, grooves applied to the hub body can also shrink to become free during cooling due to the reduction in the specific volume of the plastic. As a result, in the case of composite wheels, undesirable noises and/or play between the hub body and the ring body occur repeatedly, in particular in the axial direction. This does not only shorten the service life of the component. It also impairs the quality and comfort of the steering unit in which such a composite wheel is used.

SUMMARY

The invention is based on the task of providing a hub body for a composite wheel that enables the manufacture of a durable and reliable composite wheel as well as meeting the comfort requirements and is thereby easy to manufacture. The invention is moreover based on the task of providing a durable, reliable and easy-to-manufacture composite wheel that meets the comfort requirements. In addition, the invention is based on the task of providing a high-quality and comfortable, but at the same time, cost-effective steering unit.

A hub body according to the invention for a composite wheel, in particular a composite gear wheel, has an axis of rotation, a first front side of the hub, a second front side of the hub as well as an outer lateral surface, wherein the outer lateral surface is arranged along the axis of rotation between the first front side of the hub and the second front side of the hub. The outer lateral surface has an engagement gearing with at least one engagement tooth. Preferably, the engagement gearing comprises a plurality of engagement teeth corresponding to the at least one engagement tooth, which teeth are arranged uniformly in the circumferential direction of the outer lateral surface around the axis of rotation. The outer lateral surface may comprise a convex outer lateral section. The outer lateral surface is thus preferably crowned, at least in sections. In this way, a ring body of the composite wheel molded onto the hub can shrink onto the hub body, whereby the strength and rigidity of the connection between the hub body and the ring body can be increased. Axial forces can, moreover, be transmitted particularly advantageously by means of the convex outer lateral section. Preferably, the convex outer lateral section is arranged circumferentially around the axis of rotation. In so doing, the convex outer lateral section is preferably visible in a cross-sectional view of the hub body along the axis of rotation.

In a preferred embodiment of the invention, the root diameter of the engagement gearing has a progression of the root diameter along the at least one engagement tooth. The engagement gearing can be configured as a spur gear. In this case, the at least one engagement tooth is aligned along the axis of rotation. The progression of the root diameter can have a maximum.

Preferably, the maximum of the progression of the root diameter is arranged in the convex outer lateral section. Within the convex outer lateral section, the progression of the root diameter can have a convex root section with a convexity radius. The convexity radius can be configured in a constant or variable manner. Preferably, the maximum of the progression of the root diameter is arranged in the convex root section. The engagement gearing can comprise a semi-globoid-shaped contour on both sides of the convex outer lateral section.

Preferably, the first front side of the hub comprises a first front surface of the hub and the second front side of the hub comprises a second front surface of the hub. The second front side of the hub is preferably arranged axially opposite the first front surface of the hub. In so doing, the maximum can be arranged at a distance from the first front surface of the hub and/or the second front surface of the hub. The arrangement of the maximum at a distance from at least one of the front surfaces of the hubs can have the effect that an unfavorable superimposition of the stresses acting on the ring body can be avoided. In accordance with the front surfaces of the hub, the ring body may comprise front surfaces of the ring. Whereas operational stresses, which typically occur due to the application of external forces to the composite wheel during operation, can often be observed in the area of the first front surface of the ring and the first front surface of the hub, the shrinkage stresses occurring in the ring body occur in the convex outer lateral section, particularly in the area around the maximum. The engagement gearing with the maximum in the progression of the root diameter can, moreover, easily be produced by primary forming manufacturing processes such as, for example, sintering or transformative manufacturing processes such as, for example, impact extrusion.

Unless otherwise described, the terms "radial" and "axial" are used here and in the following in relation to the axis of rotation. Surfaces which, like the first front surface of the hub, are referred to here and in the following as "front surface", preferably define the corresponding body, which is to say, the hub body or the ring body, in the axial direction. The surfaces referred to as "front surface", in particular of the hub body, can be conically configured about the axis of rotation or have a different shape. Preferably, the surfaces referred to as the "front face" are arranged orthogonally to the axis of rotation. Surfaces of the first front side of the hub that are arranged orthogonally to the axis of rotation are thus preferably assigned to the first front surface of the hub. The outer lateral surface is preferably arranged in a ring about the axis of rotation.

The maximum can, moreover, be arranged centrally or off-center between the first front surface of the hub and the second front surface of the hub. In this way, the arrangement of the maximum can be adapted to the manufacturing process, in particular of the ring body, so that, for example, the formation of voids in the ring body can be avoided. The first front surface of the hub and/or the second front surface of the hub is preferably arranged orthogonally to the axis of rotation. Surfaces of the respective front side of the hub that are arranged orthogonally to the axis of rotation are preferably assigned to the corresponding front surface of the hub. By way of example, a ledge of the hub body may comprise such a surface. Preferably, the outer lateral surface is different from the first front surface of the hub and/or the second front surface of the hub. The outer lateral surface can be axially adjacent to the first front surface of the hub and/or to the second front surface of the hub.

The hub body can be configured in such a way that a first root front surface diameter is arranged in the first front surface of the hub and/or a second root front surface diameter is arranged in the second front surface of the hub. The first root front surface diameter can be equal or unequal to the second root front surface diameter. Preferably, the first root front surface diameter and/or the second root front surface diameter each form an end point of the progression of the root diameter. This allows the progression of the root diameter to be adapted to the respective application, in particular the expected axial forces. The hub body can thus, moreover, be advantageously designed with respect to the application of the ring body by means of injection molding. In particular, this can compensate for uneven shrinkage behavior of the plastic on both sides of the maximum.

In a preferred embodiment of the invention, the progression of the root diameter is continuous and/or differentiable from the first front surface of the hub to the second front surface of the hub. The progression of the root diameter is thus preferably not interrupted by grooves running in the circumferential direction. Sharp edges and the associated stress concentrations along the progression of the root diameter can, moreover, be avoided. In one embodiment of the invention, run-outs of the engagement gearing are arranged exclusively in the first front surface of the hub and/or in the second front surface of the hub. The outer lateral surface can thus be formed free of the run-outs of the engagement gearing. The at least one engagement tooth can extend, in particular continuously, from the first front surface of the hub to the second front surface of the hub.

In one embodiment of the invention, the convex outer lateral section extends from the first front surface of the hub to the second front surface of the hub. In this way, the engagement gearing can be configured in a particularly homogeneous manner. Such an engagement gearing can, moreover, have lower requirements with regard to the tools required for production.

In a further development of the invention, the progression of the root diameter comprises a first concave section with a first cavity radius, that is preferably constant. An engagement gearing with such a progression of the root diameter can be produced simply by gear hobbing. Due to such a progression of the root diameter, the engagement gearing may comprise a semi-globoid-shaped contour, at least in sections. In an alternative embodiment, the first cavity radius can be variable.

Preferably, the progression of the root diameter comprises a second concave section with a second cavity radius, that is preferably constant. The first cavity radius can be equal or unequal to the second cavity radius. This provides a further option for adapting the progression of the root diameter to the respective application, in particular for the expected axial forces, and/or for advantageously designing the hub body with regard to the application of the ring body by means of injection molding. The maximum of the progression of the root diameter can be located between the first concave section and the second concave section. In this way, uneven shrinkage behavior of the plastic on both sides of the maximum can, in particular, be compensated for.

In a further development of the invention, the engagement gearing is configured as helical gearing. As a result, a proportion of an axial force to be transmitted between the ring body and the hub body can also be transmitted via an engagement tooth flank of the at least one engagement tooth. This can further increase the service life of the composite wheel. As long as the composite wheel is configured as a helical composite gear wheel, the engagement gearing and a composite wheel gearing of the composite wheel are inclined in the same direction counter to the axis of rotation. An engagement helix angle of the engagement gearing is particularly preferably less than or equal to a composite wheel helix angle of the composite wheel gearing.

A tooth height of the at least one engagement tooth can be constant at least in sections along the engagement tooth flank of the at least one engagement tooth. This makes it possible to avoid sharp edges on the engagement gearing when manufacturing the hub body.

A composite wheel according to the invention, in particular a composite gear wheel, comprises the previously-described hub body and the ring body, which is arranged radially outside the hub body.

In connection with the progression of the root diameter, the terms "concave" and "convex" refer here and in the following preferably to the ring body. A convex section thus preferably describes a curvature that rises towards the ring body. A concave section preferably describes a recess that is open towards the ring body.

The ring body and the engagement gearing are arranged into each other in a meshing manner. The ring body may comprise an internal ring diameter, which can correspond to an external hub diameter of the hub body. The internal ring diameter and the external hub diameter can be variable along a circumference of the composite wheel, in particular due to the engagement gearing. In this manner, the external hub diameter at a tooth tip of the at least one engagement tooth is preferably defined by a tip circle diameter of the engagement gearing and at a tooth root of the at least one engagement tooth by a root diameter of the engagement gearing. The internal ring diameter and/or the external hub diameter can be variable along the axis of rotation.

The hub body is preferably made of metal, particularly preferably steel. The ring body is preferably made of plastic, particularly preferably polyoxymethylene. The ring body can, in particular, be manufactured by means of plastic injection molding, preferably in such a way that the ring body is overmolded directly onto the hub body. The ring body preferably lies directly and two-dimensionally against the hub body.

The ring body comprises a first axial ring body end and a second axial ring body end. In so doing, the first axial ring body end and/or the second axial ring body end can be arranged on the hub body exclusively on the outer lateral surface, preferably along the entire circumference of the composite wheel. The first axial ring body end and/or the second axial ring body end on the one hand and the hub body on the other hand are preferably only operatively connected to each other in the radial direction. In this manner, in particular, it is possible to dispense with a protrusion of the ring body directed radially towards the axis of rotation for the transmission of axial forces between the hub body and the ring body and to avoid the associated stress concentrations. At the first axial ring body end, the internal ring diameter can have a first internal ring end diameter. The first axial ring body end is preferably arranged with the first internal ring end diameter on the outer lateral surface. At the second axial ring body end, the internal ring diameter can have a second internal ring end diameter. The second axial ring body end is preferably arranged with the second internal ring end diameter on the outer lateral surface.

The ring body can, in particular, lie exclusively against the outer lateral surface of the hub body in the area of the first front side of the hub and/or of the second front side of the hub. The ring body can lie against the outer lateral surface of the hub body in such a way that it is arranged, preferably exclusively, radially adjacent to the first front surface of the hub and/or to the second front surface of the hub.

In a preferred embodiment of the invention, the engagement gearing is arranged to intersect the first front surface of the ring. In so doing, an axial end of the engagement gearing can be arranged in the first front surface of the hub. Sharp edges, which typically occur on the run-out of the engagement gearing, are thus preferably not encompassed by the ring body. Notch stresses occurring in the ring body at the run-out of the engagement gearing can thus be avoided. The maximum in the progression of the root diameter can enable the transmission of axial forces between the hub body and the ring body. The first front surface of the ring is preferably arranged orthogonally to the axis of rotation. The first internal ring end diameter can be arranged in the same plane as the first front surface of the ring. The engagement gearing preferably intersects the first front surface of the ring in such a way that the first front surface of the ring is radially adjacent to the engagement gearing. The first front surface of the ring and the first front surface of the hub can be arranged in the same plane.

The first front surface of the ring and the first front surface of the hub can thereby be arranged radially adjacent to each other. Alternatively, the first front surface of the ring and the first front surface of the hub can be arranged in a different plane.

The ring body preferably comprises a second front surface of the ring arranged axially opposite the first front surface of the ring at the second axial ring body end, wherein the engagement gearing is arranged to intersect the second front surface of the ring. In this manner, the negative effects of sharp edges of the hub body on the ring body in the area of the second front surface of the ring described above can be avoided. The engagement gearing is preferably arranged to intersect the second front surface of the ring in such a way that the second front surface of the ring is radially directly adjacent to the engagement gearing. The second front surface of the ring and the second front surface of the hub can be arranged in the same plane. In so doing, the second front surface of the ring and the second front surface of the hub can be arranged radially adjacent to each other. Alternatively, the second front surface of the ring and the second front surface of the hub can be arranged in different planes. The second front surface of the ring is preferably arranged orthogonally to the axis of rotation.

A steering unit according to the invention for a motor vehicle comprises a composite wheel as described above.

BRIEF DESCRIPTION OF THE DRAWINGS

An embodiment of the invention is elucidated with reference to the following figures. Wherein.

DETAILED DESCRIPTION

FIG. 1*a* through FIG. 5*b* show different views of various embodiment examples. For the sake of clarity, not all reference signs are used in each figure. The same reference signs are used for identical and functionally identical parts. The figures with the index b, which is to say, FIG. 1*b*, FIG. 2*b*, etc. (hereinafter referred to as "Figs. b"), respectively show a two-dimensional cross-sectional view of the parts shown in the embodiment examples represented in the figures with the index a, which is to say, FIG. 1*a*, FIG. 2*a*, etc. (hereinafter referred to as "Figs. a".)

Figure 1A:
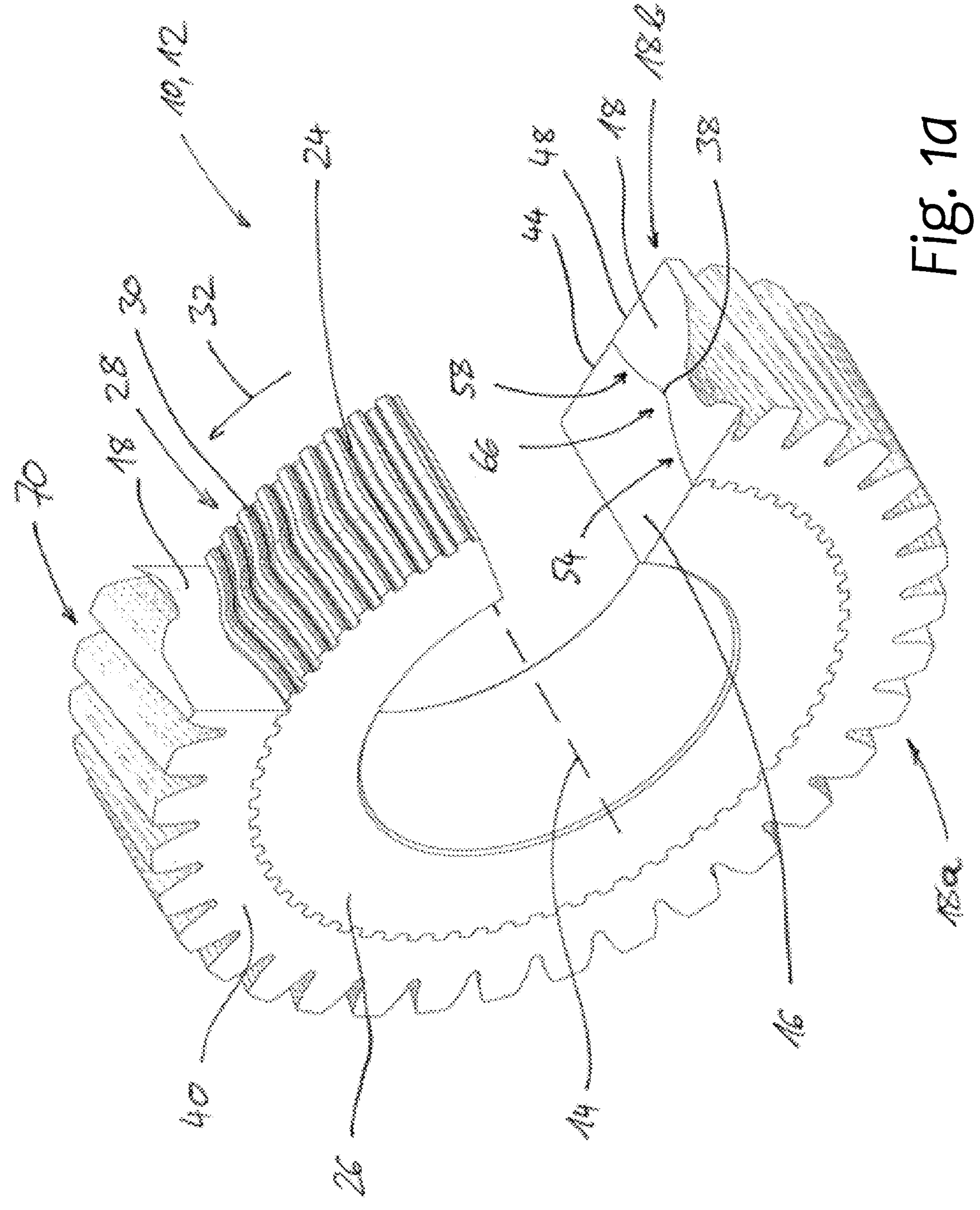
FIG. 1*a* shows a schematic perspective cross-sectional view of a first embodiment of a composite wheel.

"Figs. a" show schematic perspective cross-sectional views of a composite wheel 10, which is configured as a composite gear wheel 12. The composite wheel 10 comprises an axis of rotation 14, a hub body 16 and a ring body 18 arranged radially outside the hub body 16. The hub body 16 comprises a first front side of the hub 20, a second front side of the hub 22 and an outer lateral surface 24, wherein the first front side of the hub 20 comprises a first front surface of the hub 26. The outer lateral surface 24 is arranged along the axis of rotation 14 between the first front side of the hub 20 and the second front side of the hub 22. The outer lateral surface 24, moreover, comprises an engagement gearing 28 with a plurality of engagement teeth 30, which teeth are arranged uniformly about the axis of rotation 14 in a circumferential direction 32 of the outer lateral surface 24. FIG. 1*a* thereby clearly shows that the first front surface of the hub 26 is arranged orthogonally to the axis of rotation 14 and the outer lateral surface 24 is arranged in a ring about the axis of rotation 14. The ring body 18 and the engagement gearing 28 are arranged in a meshing manner into each other.

The ring body 18 comprises an internal ring diameter 19, which can correspond to an external hub diameter 17 of the hub body 16. In particular due to the engagement gearing 28, the internal ring diameter 19 and the external hub diameter 17 are variable along a circumference of the composite wheel 10. In this manner, the external hub diameter 17 can be defined at a tooth tip 31 of one of the engagement teeth 30 by a tip circle diameter of the engagement gearing 28 and at a tooth root 33 of one of the engagement teeth 30 by a root diameter 34 of the engagement gearing 28. As shown by the embodiment examples of FIG. 1*a* through FIG. 4*b*, the internal ring diameter 19 and/or the external hub diameter 17 can be variable along the axis of rotation 14.

The hub body 16 is preferably made of metal, particularly preferably steel. The ring body 18 is preferably made of plastic, particularly preferably polyoxymethylene. The ring body 18 can, in particular, be manufactured by means of plastic injection molding, preferably in such a way that the ring body 18 is overmolded directly onto the hub body 16. In this way, the arrangement shown in the figures can be achieved, in which the ring body 18 lies directly and two-dimensionally against the hub body 16.

As in "Figs. a", the cross-section in "Figs. b" runs through the gap between two of the engagement teeth 30 and along the engagement teeth 30. In the embodiment examples in FIG. 1*a* through FIG. 2*b* and FIG. 4*a* through FIG. 5*b*, the engagement gearing 28 is straight-toothed. The engagement teeth 30 shown in these figures and thereby also the cross-sectional planes of the cross-sections shown are thereby each arranged along the axis of rotation 14. The root diameter 34 of the engagement gearing 30 has a progression of the root diameter 36 along the engagement teeth 30, which is clearly recognizable from the selected cross-sectional planes along the engagement teeth 30, particularly in "Figs. b". As shown in "Figs. a", the progression of the root diameter 36 has a maximum 38 at a distance from the first front surface of the hub 26.

In all the embodiment examples shown, the ring body 18 comprises a first axial ring body end 18*a* and a second axial ring body end 18*b*. In so doing, on the hub body 16 along the entire circumference of the composite wheel 10, the first axial ring body end 18*a* is exclusively arranged on the outer lateral surface 24. In particular in the first and third embodiment examples (FIG. 1*a*, FIG. 1*b*, FIG. 3*a*, FIG. 3*b*), the first axial ring body end 18*a* and the hub body 16 are in operative connection with each other exclusively in the radial direction. At the first axial ring body end 18*a*, the internal ring diameter 19 comprises a first internal ring end diameter 19*a*. The first axial ring body end 18*a* is arranged with the first internal ring end diameter 19*a* on the outer lateral surface 24.

In the embodiment examples of FIG. 1*a* through FIG. 5*b*, the ring body 18 in the area of the first front side of the hub 20 is also exclusively adjacent to the outer lateral surface 24 of the hub body 16. In so doing, the ring body 18 may be arranged exclusively radially adjacent to the first front surface of the hub 26.

Figure 1B:
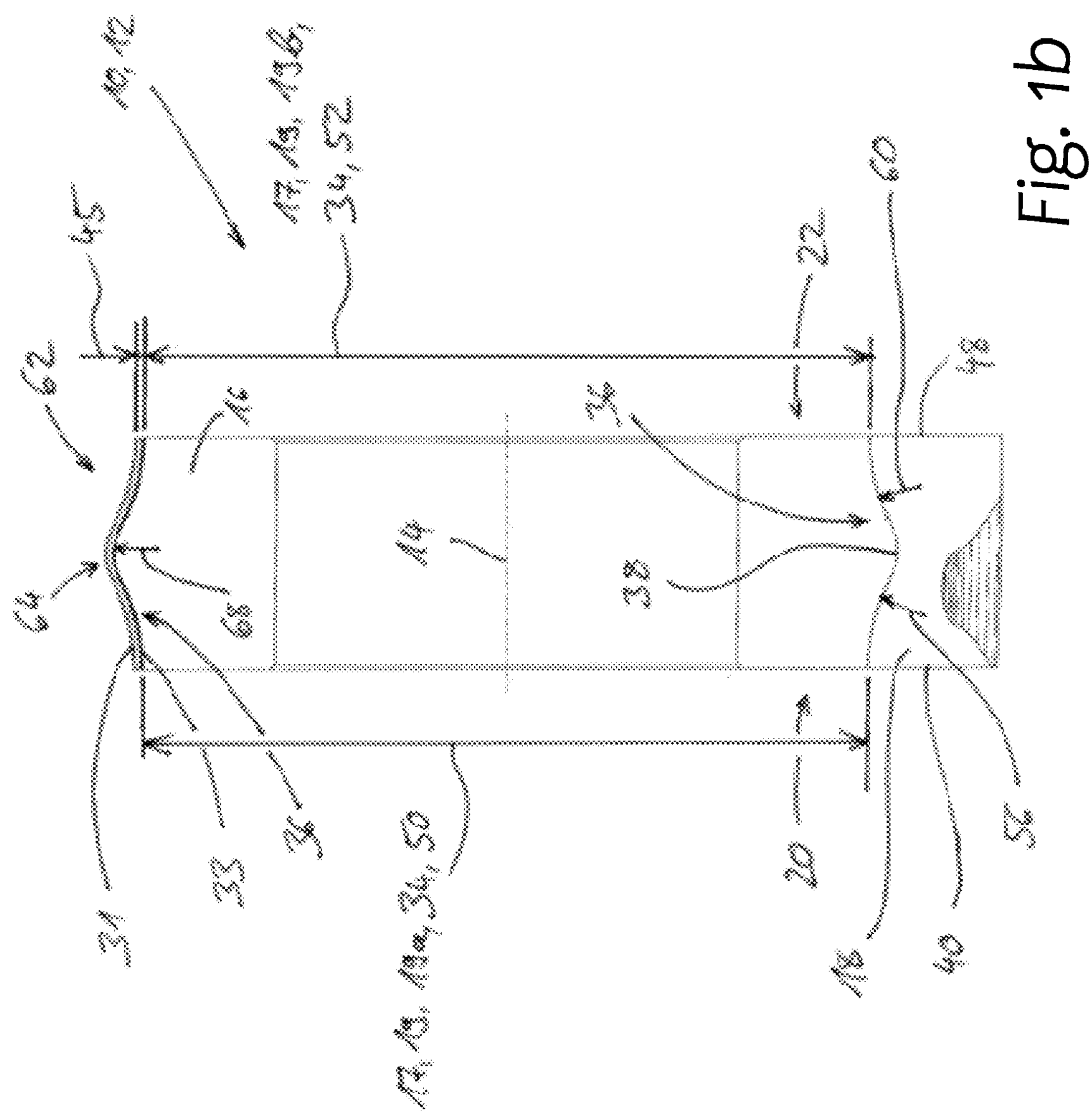
FIG. 1*b* shows a schematic two-dimensional cross-sectional view of the embodiment shown in FIG. 1*a*.
Figure 2A:
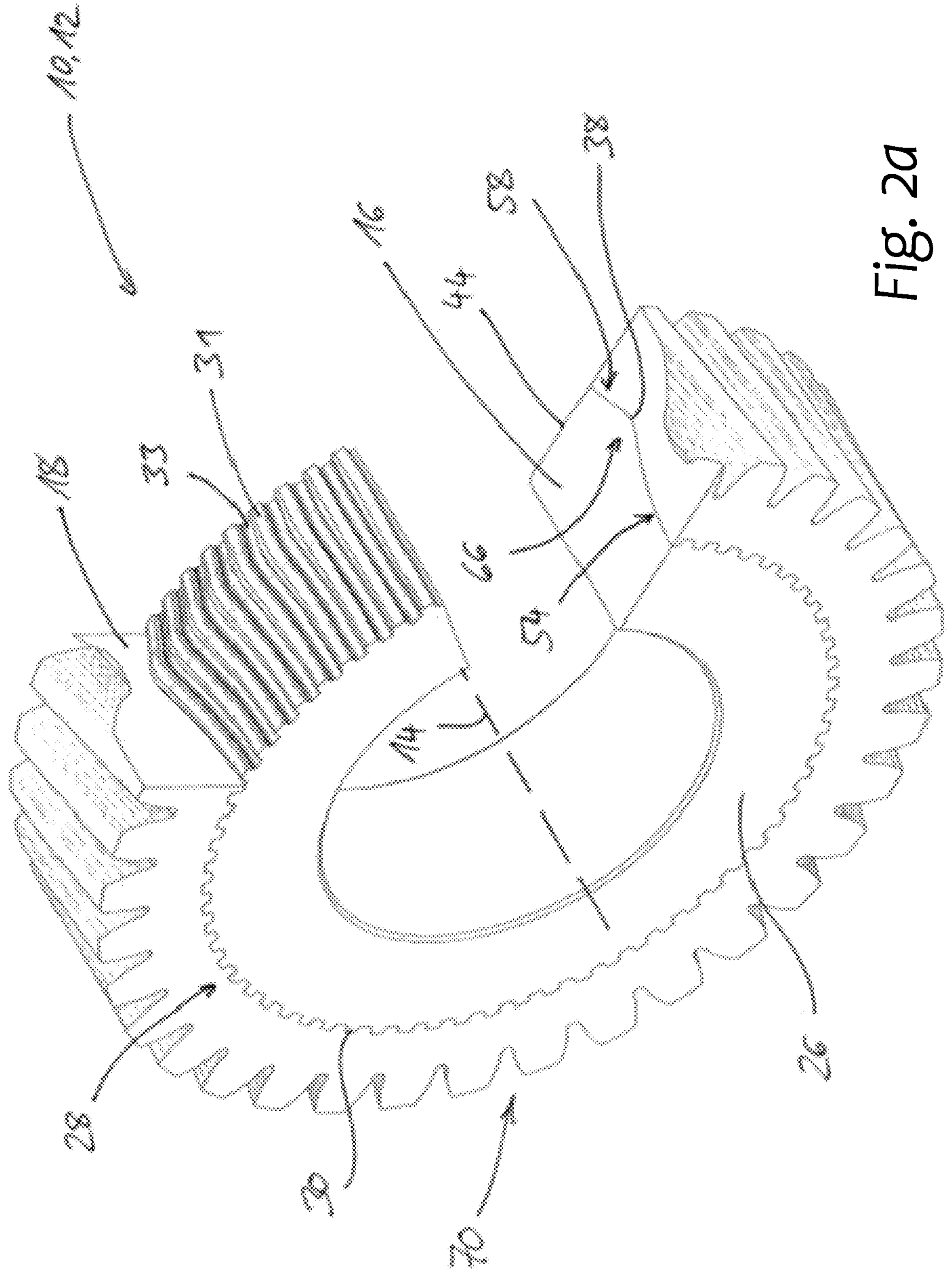
FIG. 2*a* shows a schematic perspective cross-sectional view of a second embodiment of a composite wheel.
Figure 2B:
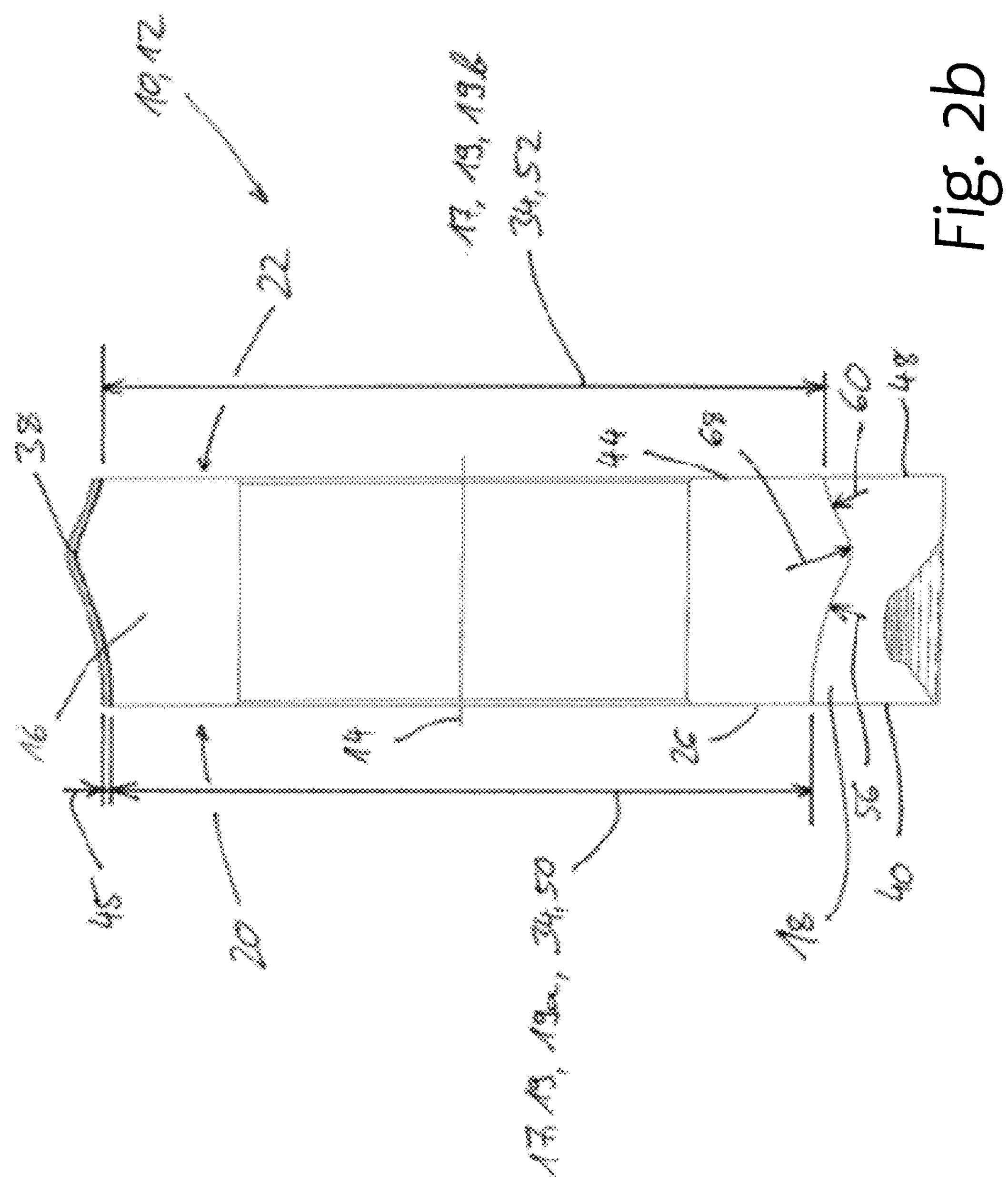
FIG. 2*b* shows a schematic two-dimensional cross-sectional view of the embodiment shown in FIG. 2*a*.

Looking at the lower half, for example, of the cross-sectional view shown in FIG. 1*b*, it is easy to see that the plastic-injected ring body 18 shrinks to the maximum 38 during cooling. Higher shrinkage stresses also occur there. Operating stresses, which typically occur due to the application of external forces to the composite wheel 10 during operation, can often be observed at the first axial ring body end 18*a* in the area of a first front surface of the ring 40 and the first front surface of the hub 26, so that a relatively uniform stress distribution can be achieved with the arrangement shown.

In the embodiment examples shown in FIG. 1*a* through FIG. 5*b*, the engagement gearing 28 is arranged to intersect the first front surface of the ring 40. An axial end of the engagement gearing 28 is arranged in the first front surface of the hub 26. The first front surface of the ring 28 is arranged orthogonally to the axis of rotation 14. The perspective views of "Figs. a" show that the engagement gearing 28 is arranged to intersect the first front surface of the ring 40 in such a way that the first front surface of the ring 40 is radially directly adjacent to the engagement gearing 28. The first front surface of the ring 40 and the first front surface of the hub 26 can, in so doing, be arranged in the same plane. In the corresponding embodiment examples, the first front surface of the ring 40 and the first front surface of the hub 26 are, moreover, arranged radially adjacent to one another.

As the two-dimensional cross-sectional views of "Figs. b" illustrate, the second front side of the hub 22 comprises a second front surface of the hub 44, which is arranged axially opposite to the first front surface of the hub 26. The maximum 38 can thereby be arranged centrally (FIG. 1*a*, FIG. 1*b*, FIG. 3*a* through FIG. 4*b*) or off-center (FIG. 2*a*, FIG. 2*b*) between the first front surface of the hub 26 and the second front surface of the hub 44. The fifth embodiment example is an embodiment example that has two maxima 38. In so doing, the two maxima 38 can be configured with different sizes. These are also each arranged off-center (FIG. 5*a*, FIG. 5*b*). In all the embodiment examples shown, the maximum 38 is arranged at a distance from the second front surface of the hub 44. Like the first front surface of the hub 26, the second front surface of the hub 44 is also arranged orthogonally to the axis of rotation 14. "Figs. b" moreover show that a tooth height 45 of the engagement teeth 30 is constant, at least in sections, along the engagement tooth flank.

In the embodiment examples of FIG. 1*a* through FIG. 5*b*, the ring body 18 in the area of the second front side of the hub 22 is located exclusively on the outer lateral surface 24 of the hub body 16. In so doing, the second axial ring body end 18*b* is, in particular, arranged on the hub body 16 exclusively on the outer lateral surface 24 along the entire circumference of the composite wheel 10. The second axial ring body end 18*b* has a second internal ring end diameter 19*b*, with which the second axial ring body end 18*b* is arranged on the outer lateral surface 24. The ring body 18 can, in particular, rest against the outer lateral surface of the hub body 16 in such a way that it is arranged exclusively radially adjacent to the second front surface of the hub 44.

At the second axial ring body end 18*b*, the ring body 18 comprises a second front surface of the ring 48 arranged axially opposite the first front surface of the ring 40, which is arranged orthogonally to the axis of rotation 18. In the embodiment examples of FIG. 1*a* through FIG. 5*b*, the engagement gearing 28 is arranged to intersect the second front surface of the ring 48 in such a way that the second front surface of the ring 48 is radially directly adjacent to the engagement gearing 28. The second front surface of the ring 48 and the second front surface of the hub 44 can thereby be arranged in the same plane and radially adjacent to each other.

As "Figs. b" show, the composite wheel 10 can be configured in such a way that a first root front surface diameter 50 is arranged in the first front surface of the hub 26 and/or a second root front surface diameter 52 is arranged in the second front surface of the hub 44. The first root front surface diameter 50 can be equal (FIG. 1*b*, 3*b*, 4*b*, 5*b*) or unequal (FIG. 2*b*) to the second root front surface diameter 52. As "Figs. b" show, the first root front surface diameter 50 and/or the second root front surface diameter 52 each form an end point of the progression of the root diameter 36. This allows the composite wheel 10 to be adapted, for example, with regard to the axial forces to be expected and/or with regard to the manufacturing boundary conditions.

In the embodiment examples of FIG. 1*a* through FIG. 4*b*, the progression of the root diameter 36 is also continuous and differentiable from the first front surface of the hub 26 to the second front surface of the hub 44. This is illustrated in particular by FIG. 1*b*, FIG. 2*b*, FIG. 3*b* and FIG. 4*b*.

In the embodiment examples of FIG. 1*a* through FIG. 3*b*, just as in the fifth embodiment example, the progression of the root diameter 36 comprises a first concave section 54 in the form of a recess open towards the ring body 18 with a, preferably constant, first cavity radius 56.

In the embodiment examples of FIG. 1*a* through FIG. 3*b* and FIG. 5*a* and FIG. 5*b*, the progression of the root diameter 36 also has a second concave section 58 with a, preferably constant, second cavity radius 60. Whereas in the first, third and fifth embodiment examples the first cavity radius 56 is equal to the second cavity radius 60, in the second embodiment example the first cavity radius 56 is not equal to the second cavity radius 60. As FIG. 1*a* through FIG. 3*b* further show, the maximum 38 of the progression of the root diameter 36 can be arranged between the first concave section 54 and the second concave section 58.

As FIG. 1*a* through FIG. 5*b* show, the outer lateral surface 24 can have a convex outer lateral section 64 in the form of a curvature rising towards the ring body. In so doing, the maximum of the progression of the root diameter 36 is arranged within the convex outer lateral section 64. In the embodiment examples of FIG. 1*a* through FIG. 4*b*, the progression of the root diameter 36 comprises a convex root section 66 with a convexity radius 68 within the convex outer lateral section 64. In so doing, the maximum 38 of the progression of the root diameter 36 is arranged in the convex root section 66. The convexity radius 68 is constant, at least in the fourth embodiment example. In the embodiment examples of FIG. 1*a* through FIG. 3*b* and FIG. 5*a* and FIG. 5*b*, the first cavity radius 56 and the second cavity radius 60 are constant on both sides of the convex outer lateral section 64, so that, in sections, the engagement gearing 28 has a semi-globoid-shaped contour.

Figure 4A:
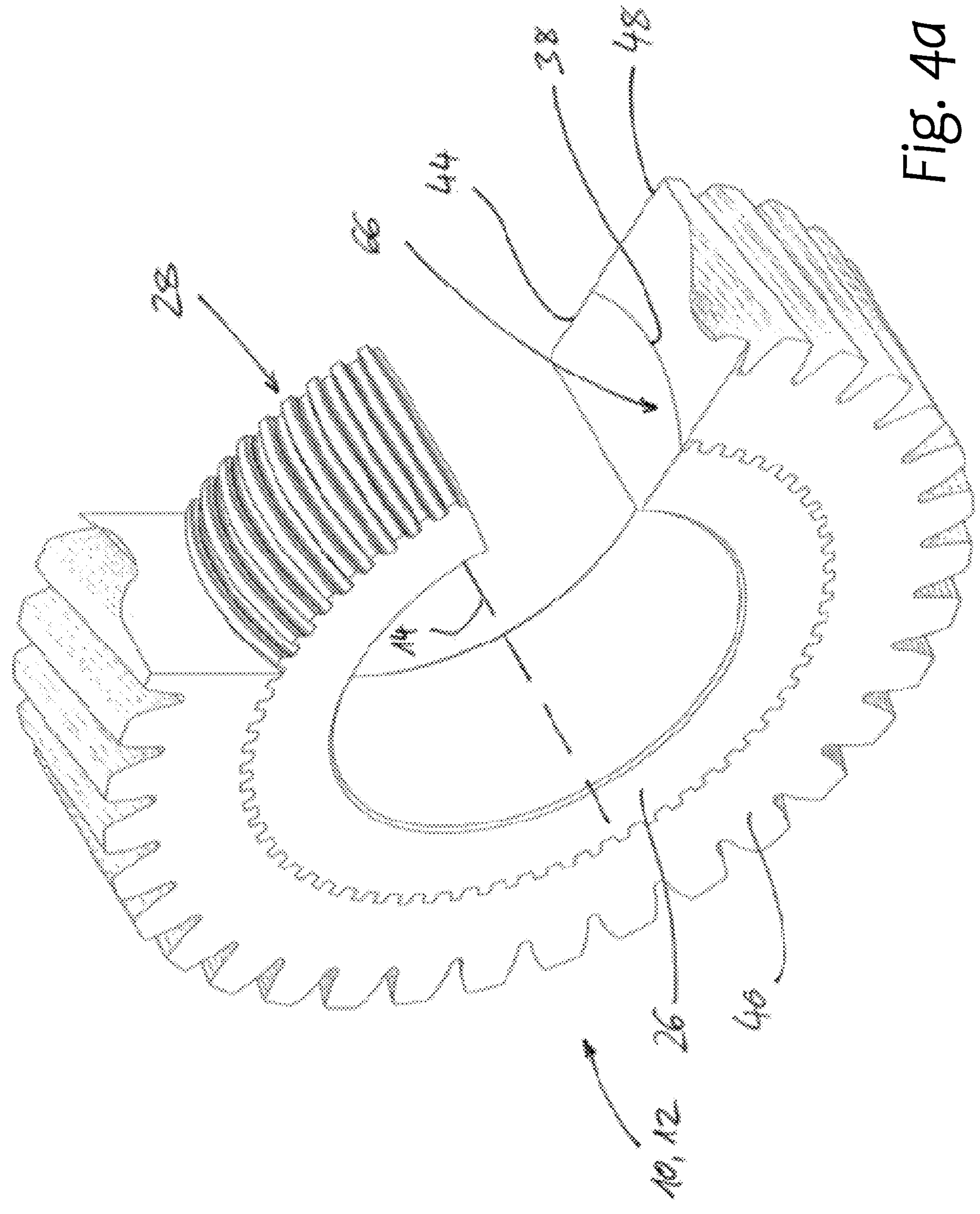
FIG. 4*a* shows a schematic perspective cross-sectional view of a fourth embodiment of a composite wheel.
Figure 4B:
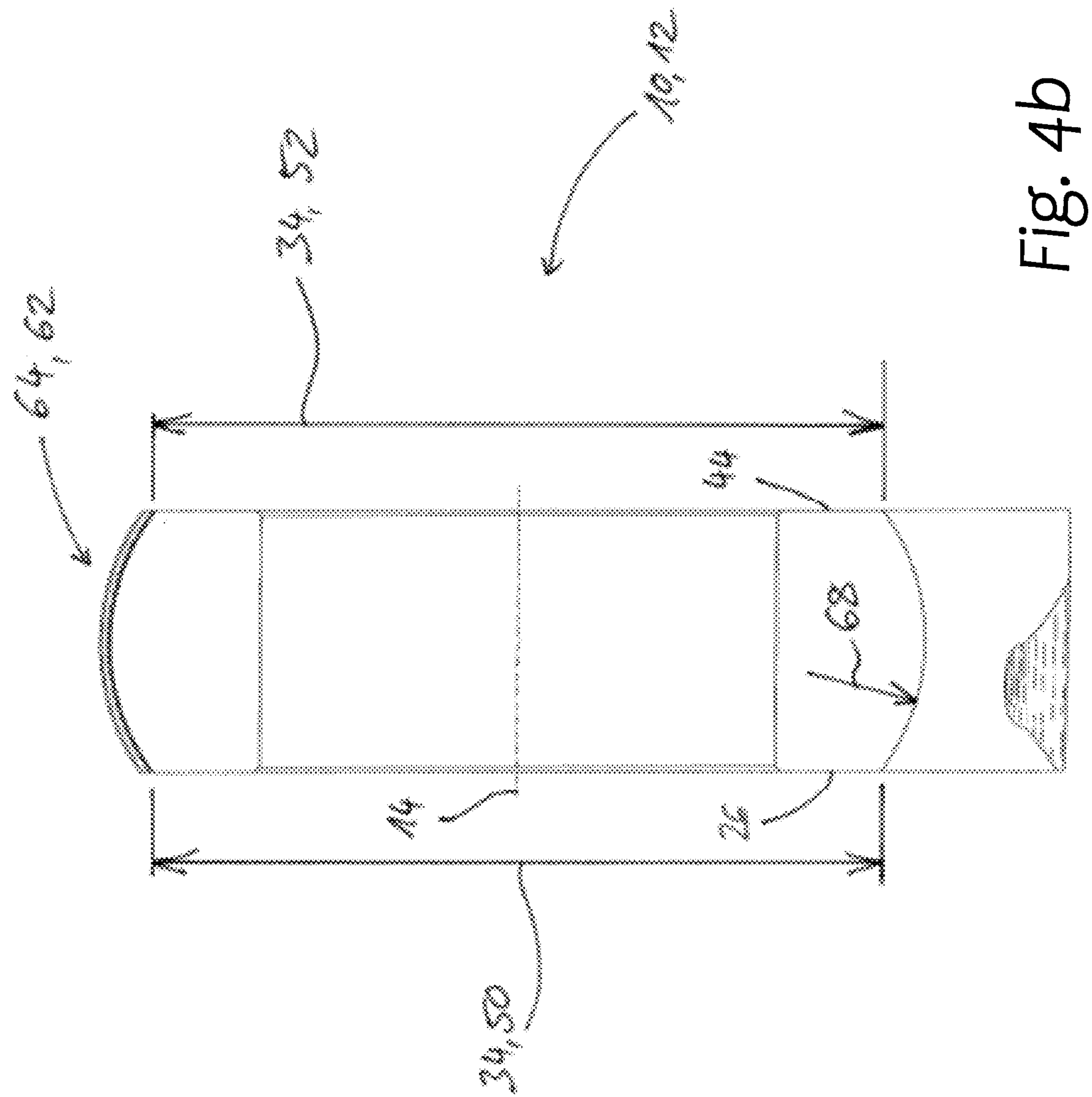
FIG. 4*b* shows a schematic two-dimensional cross-sectional view of the embodiment shown in FIG. 4*a*.
Figure 5A:
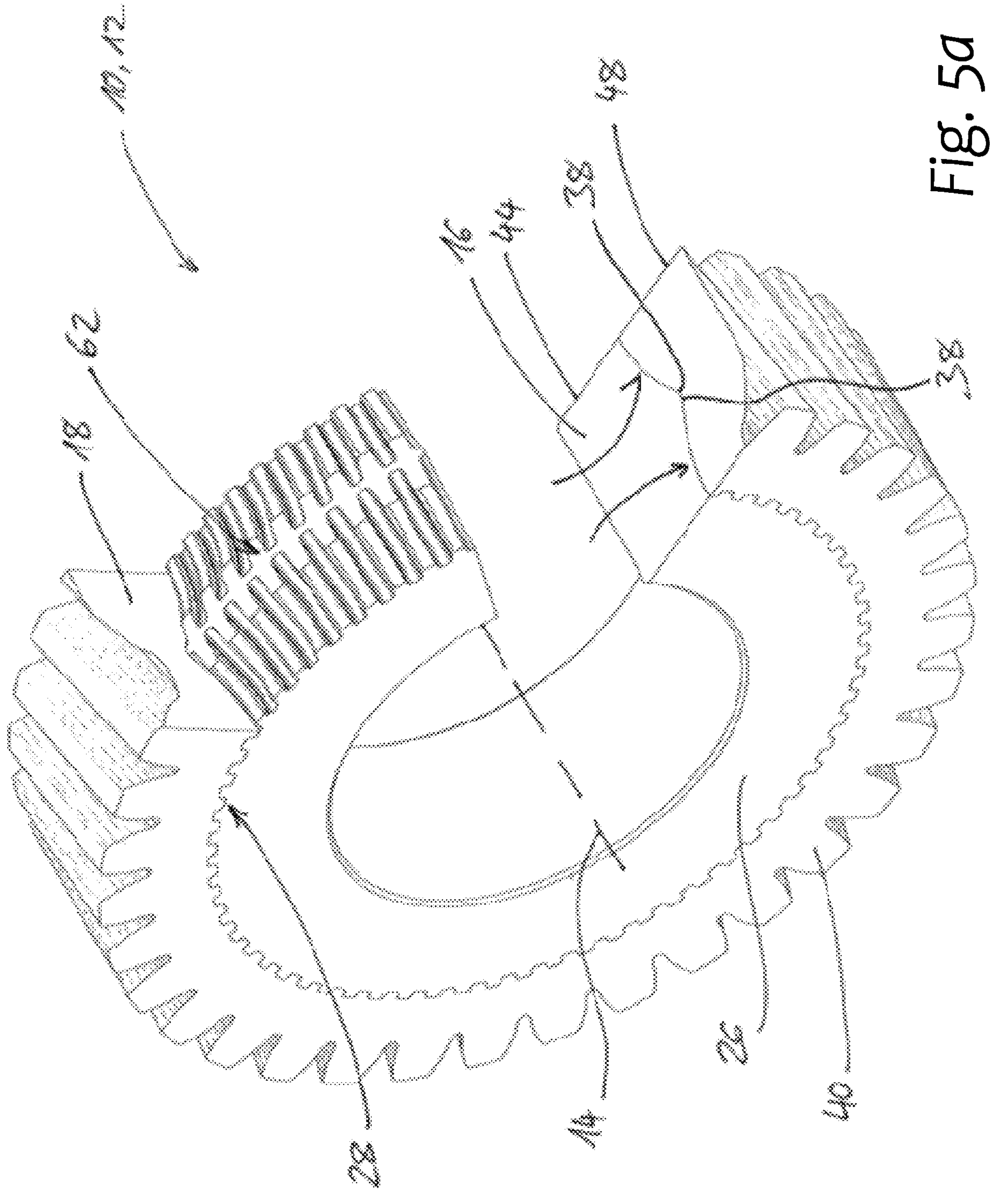
FIG. 5*a* shows a schematic perspective cross-sectional view of a fifth embodiment of a composite wheel.
Figure 5B:
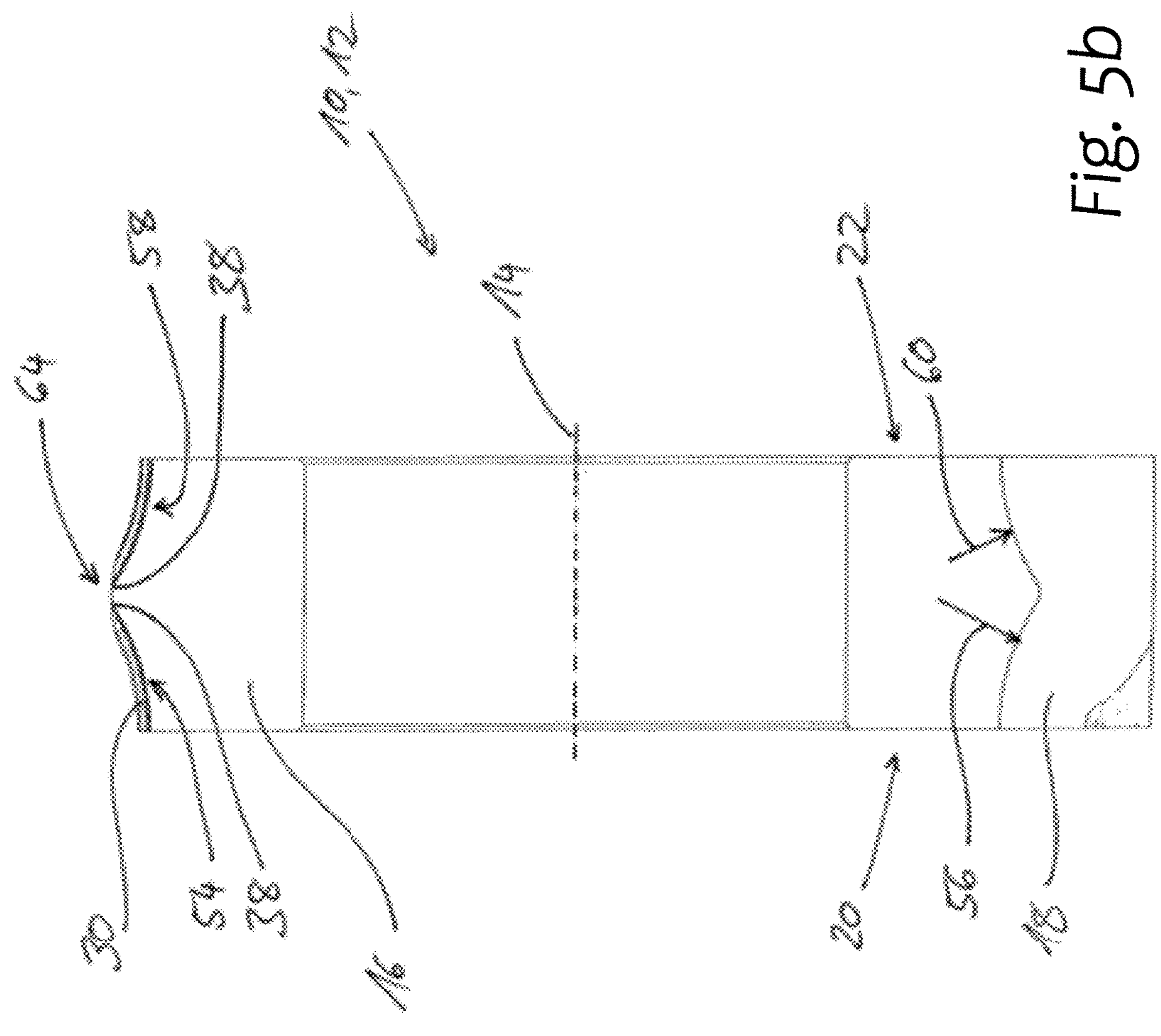
FIG. 5*b* shows a schematic two-dimensional cross-sectional view of the embodiment shown in FIG. 5*a*.

In the fourth embodiment example, the convex outer lateral section 64 extends from the first front surface of the hub 26 to the second front surface of the hub 44 (FIG. 4*a* and FIG. 4*b*).

Figure 3A:
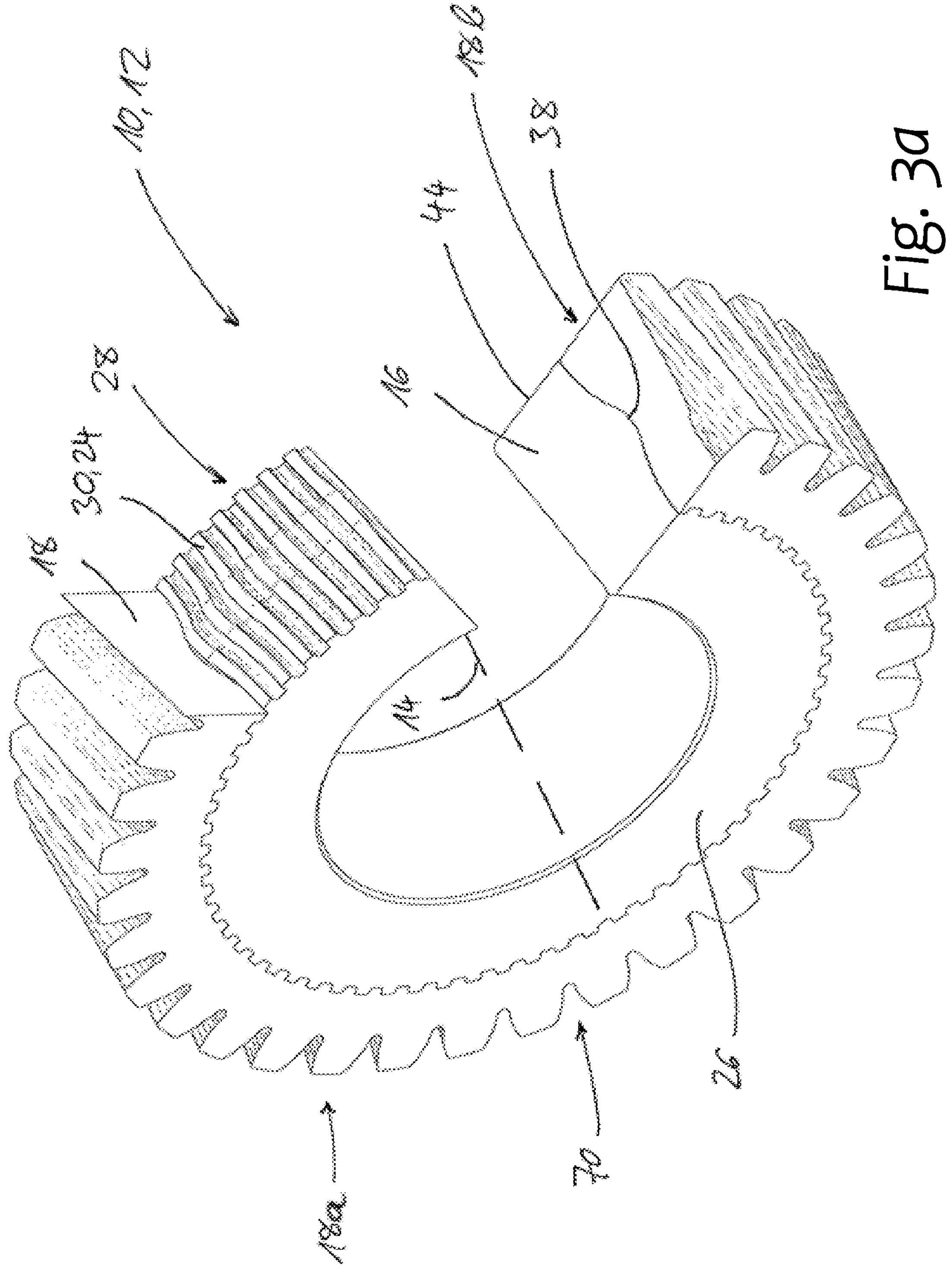
FIG. 3*a* shows a schematic perspective cross-sectional view of a third embodiment of a composite wheel.
Figure 3B:
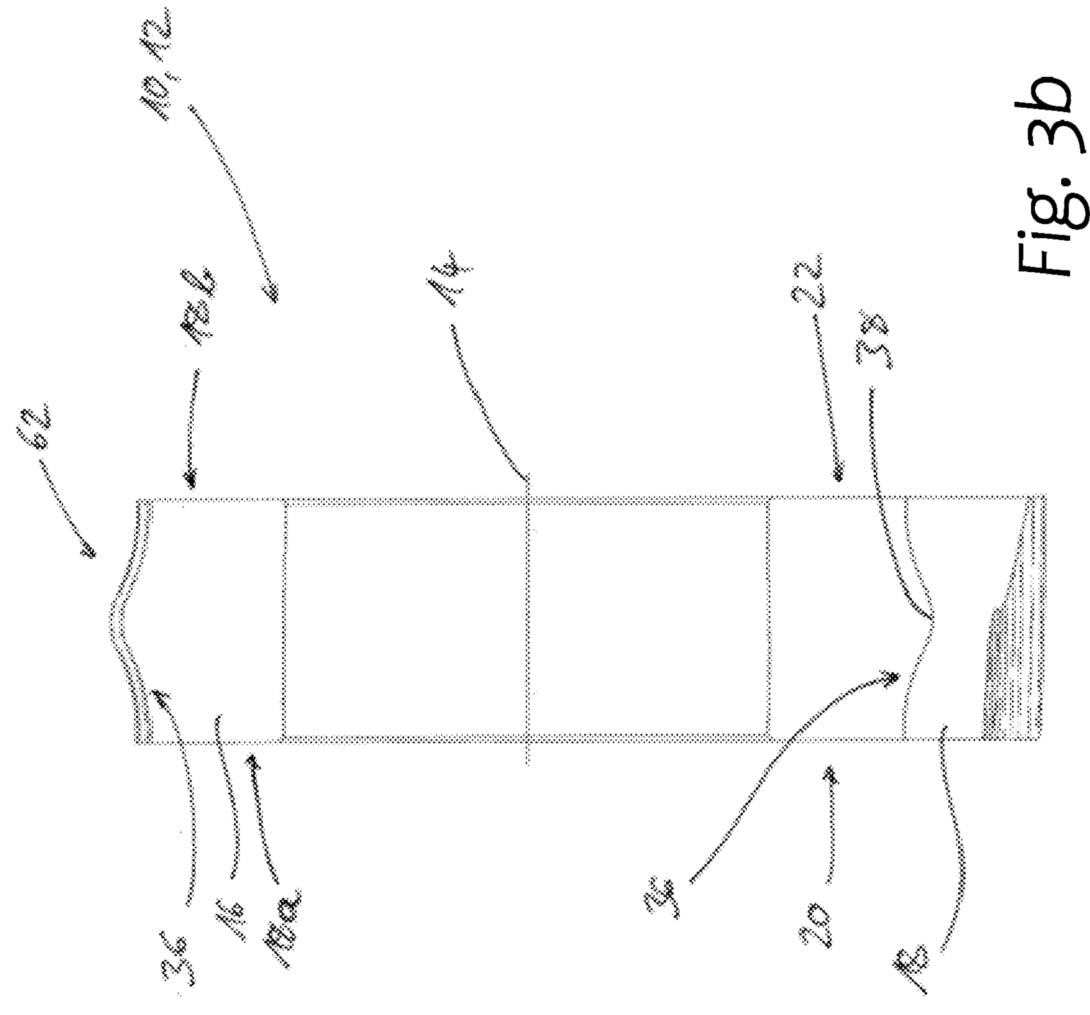
FIG. 3*b* shows a schematic two-dimensional cross-sectional view of the embodiment shown in FIG. 3*a*.

As FIG. 3*a* shows, it is also possible to design the engagement gearing 28 as helical gearing. This means that a proportion of the axial force to be transmitted between the ring body 18 and the hub body 16 can also be transmitted by means of the engagement tooth flanks of the engagement teeth 30. As in the case of all of the embodiment examples shown, the composite wheel 10 shown in FIG. 3*a* is also configured as a helical composite gear wheel 12. In the case of the helical-toothed engagement gearing 28 of the third embodiment example, the engagement gearing 28 and a composite wheel gearing 70 of the composite wheel 10 are respectively inclined in the same direction relative to the axis of rotation 14. In so doing, in the third embodiment example, an engagement helix angle of the engagement gearing 28 is lesser than a composite wheel helix angle of the composite wheel gearing 70 (FIG. 3*a*).

LIST OF REFERENCE SYMBOLS

10 Composite wheel
12 Composite gear wheel
14 Axis of rotation
16 Hub body
17 External hub diameter
18 Ring body
18*a* First axial ring body end
18*b* Second axial ring body end
19 Internal ring diameter
19*a* First internal ring end diameter
19*b* Second internal ring end diameter
20 First front side of the hub
22 Second front side of the hub
24 Outer lateral surface
26 First front surface of the hub
28 Engagement gearing
30 Engagement tooth
31 Tooth tip
32 Circumferential direction
33 Tooth root
34 Root diameter
36 Progression of the root diameter
38 Maximum
40 First front surface of the ring
42 Run-out
44 Second front surface of the hub
45 Tooth height
46 Protrusion
48 Second front surface of the ring
50 First root front surface diameter
52 Second root front surface diameter
54 First concave section
56 First cavity radius
58 Second concave section
60 Second cavity radius
64 Convex outer lateral section
66 Convex root section
68 Convexity radius
70 Composite wheel gearing

The invention claimed is:

1. Hub body (16) for a composite gearwheel (12), comprising an axis of rotation (14), a first front side of the hub (20), a second front side of the hub (22), an outer lateral surface (24) arranged along the axis of rotation (14) between the first front side of the hub (20) and the second front side of the hub (22), wherein the outer lateral surface (24) has an engagement gearing (28) with at least one engagement tooth (30), characterized in that the outer lateral surface (24) comprises a convex outer lateral section (64); and a root diameter (34) of the engagement gearing (28) comprises an increasing progression of the root diameter (36) along the at least one engagement tooth (30) with a maximum (38).

2. Hub body according to claim 1, characterized in that a maximum (38) progression of the root diameter (36) is arranged in the convex outer lateral section (64).

3. Hub body according to claim 1, characterized in that the first front side of the hub (20) comprises a first front surface of the hub (26) and the second front side of the hub (22) comprises a second front surface of the hub (44), wherein the maximum (38)

is arranged at a distance from the first front surface of the hub (26) and/or the second front surface of the hub (44), and/or is arranged centrally or off-center between the first front surface of the hub (26) and the second front surface of the hub (44).

4. Hub body according to claim 3, characterized in that a first root front surface diameter (50) arranged in the first front surface of the hub (26) is equal to or unequal to a second root front surface diameter (52) arranged in the second front surface of the hub (44).

5. Hub body according to claim 3, characterized in that the progression of the root diameter (36) is continuous and/or differentiable from the first front surface of the hub (26) to the second front surface of the hub (44).

6. Hub body according to claim 3, characterized in that the convex outer lateral section (64) extends from the first front surface of the hub (26) to the second front surface of the hub (44).

7. Hub body according to claim 1, characterized in that the progression of the root diameter (36) comprises a first concave section (54) with a first cavity radius (56), that is constant.

8. Hub body according to claim 7, characterized in that the progression of the root diameter (36) comprises a second concave section (58) with a second cavity radius (60), that is constant, wherein the first cavity radius (56) is equal or unequal to the second cavity radius (60).

9. Hub body according to claim 1, characterized in that the engagement gearing (28) is configured as helical gearing.

10. A composite gear wheel (12), with a hub body (16) according claim 1 and a ring body (18) arranged radially outside the hub body (16), comprising a first axial ring body end (18*a*) and a second axial ring body end (18*b*), wherein the ring body (18) and the engagement gearing (28) are arranged into each other in a meshing manner.

11. Composite wheel according to claim 10, characterized in that the first axial ring body end (18*a*) and/or the second axial ring body end (18*b*) is arranged on the hub body (16) exclusively on the outer lateral surface (24).

12. Composite wheel according to claim 10, characterized in that the ring body (18) comprises a first front surface of the ring (40) at the first axial ring body end (18*a*) and the engagement gearing (28) is arranged to intersect the first front surface of the ring (40).

13. Composite wheel according to claim 10, characterized in that the ring body (18) comprises a second front surface of the ring (48) arranged axially opposite the first front surface of the ring (40) at the second axial ring body end (18*b*), wherein the engagement gearing (28) is arranged to intersect the second front surface of the ring (48).

14. Steering unit for a motor vehicle with a composite wheel (10) according to claim 10.

* * * * *